US009665457B2

(12) United States Patent
Moon et al.

(10) Patent No.: US 9,665,457 B2
(45) Date of Patent: May 30, 2017

(54) METHOD FOR CONTROLLING PROCESS BASED ON NETWORK OPERATION MODE AND APPARATUS THEREFOR

(71) Applicant: ELECTRONICS & TELECOMMUNICATIONS RESEARCH INSTITUTE, Daejeon (KR)

(72) Inventors: Seong Moon, Daejeon (KR); Ho Yong Ryu, Daejeon (KR); Ho Sun Yoon, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 14/620,734

(22) Filed: Feb. 12, 2015

(65) Prior Publication Data
US 2015/0229541 A1    Aug. 13, 2015

(30) Foreign Application Priority Data
Feb. 12, 2014    (KR) ........................ 10-2014-0016133

(51) Int. Cl.
*G06F 11/07* (2006.01)
*G06F 11/30* (2006.01)
*G06F 11/20* (2006.01)
*G06F 9/445* (2006.01)

(52) U.S. Cl.
CPC ............ *G06F 11/3055* (2013.01); *G06F 8/61* (2013.01); *G06F 11/2005* (2013.01); *G06F 11/2097* (2013.01); *G06F 2201/845* (2013.01)

(58) Field of Classification Search
CPC .......................... G06F 11/2028; G06F 11/2097
USPC .................................. 714/4.11, 6.3
See application file for complete search history.

(56) References Cited

U.S. PATENT DOCUMENTS

| 7,392,403 B1 * | 6/2008 | Munetoh ............... G06F 21/602 380/28 |
| 7,706,259 B2 | 4/2010 | Kim et al. |
| 2002/0167952 A1 * | 11/2002 | Watson ............... G06F 11/2033 370/401 |
| 2003/0208527 A1 * | 11/2003 | Lglesais .................. H04L 12/24 709/203 |
| 2004/0210888 A1 * | 10/2004 | Bergen .................... G06F 9/461 717/168 |
| 2005/0005200 A1 * | 1/2005 | Matena ................. G06F 9/5072 714/38.13 |
| 2007/0083861 A1 * | 4/2007 | Becker ...................... G06F 8/60 717/174 |

(Continued)

FOREIGN PATENT DOCUMENTS

| KR | 1020000032942 A | 6/2000 |
| KR | 1020070082790 A | 8/2007 |
| KR | 1020080053115 A | 6/2008 |

*Primary Examiner* — Chae Ko
(74) *Attorney, Agent, or Firm* — Ladas & Parry LLP

(57) ABSTRACT

Disclosed are a method of controlling a process based on a network operation mode and an apparatus therefor. A process controlling method performed in a network device includes determining an operation mode for an operating system of the network device, determining an entity for controlling a process based on the determined operation mode, and controlling the process through the determined entity. According to the present invention, it is possible to control a process lifecycle through the same interface regardless of the network operation mode.

15 Claims, 9 Drawing Sheets

(56) References Cited

U.S. PATENT DOCUMENTS

| | | | |
|---|---|---|---|
| 2008/0005614 A1* | 1/2008 | Lubbers | G06F 11/2092 714/11 |
| 2009/0262741 A1* | 10/2009 | Jungck | H04L 29/12066 370/392 |
| 2010/0293293 A1* | 11/2010 | Beser | H04L 45/00 709/238 |
| 2012/0191969 A1* | 7/2012 | Clifford | G06F 11/1464 713/150 |
| 2012/0210416 A1* | 8/2012 | Mihelich | H04L 63/0218 726/11 |
| 2012/0275465 A1* | 11/2012 | Gale | H04L 41/042 370/419 |
| 2014/0185427 A1* | 7/2014 | Ditzel, III | H04L 12/437 370/223 |
| 2014/0244936 A1* | 8/2014 | Maharana | G06F 12/0815 711/135 |
| 2014/0269762 A1* | 9/2014 | Voit | H04L 45/52 370/466 |
| 2015/0043330 A1* | 2/2015 | Hu | H04L 49/557 370/225 |
| 2015/0098362 A1* | 4/2015 | Merck | H04L 45/44 370/256 |
| 2015/0134880 A1* | 5/2015 | Danilak | G06F 12/0246 711/103 |
| 2015/0193173 A1* | 7/2015 | Bates | G06F 3/0686 711/112 |
| 2015/0236900 A1* | 8/2015 | Chung | H04L 69/02 709/221 |
| 2015/0317169 A1* | 11/2015 | Sinha | H04L 61/2076 713/2 |
| 2015/0381726 A1* | 12/2015 | Hathorn | H04L 67/1097 709/213 |
| 2016/0062350 A1* | 3/2016 | Prall | G05B 19/41855 700/20 |

* cited by examiner

METHOD FOR CONTROLLING PROCESS BASED ON NETWORK OPERATION MODE AND APPARATUS THEREFOR

CLAIM FOR PRIORITY

This application claims priority to Korean Patent Application No. 2014-0016133 filed on Feb. 12, 2014 in the Korean Intellectual Property Office (KIPO), the entire contents of which are hereby incorporated by reference.

BACKGROUND

1. Technical Field

The present invention relates to a method of controlling a process of a network operating system and an apparatus therefor, and more specifically, to a method of controlling a process based on an operation mode of a network operating system and an apparatus therefor.

2. Related Art

Software that performs various functions is installed in a network device such as a router so as to control the network device. In general, such software is collectively called a network operating system. Further, the network device may be configured as a single mode device or a redundant mode device depending on importance of the network device. The single mode device generally includes one controller, and the redundant mode device includes an active controller and a standby controller.

The active controller of the redundant mode device means a controller that actually performs service, and the standby controller is a kind of backup device that takes over a role of the active controller to perform the service when hardware or software of the controller currently operating in an active mode fails.

An active role or a standby role should be able to be assigned to the same process depending on the single mode or the redundant mode in which equipment with software such as a network operating system is operated. Therefore, a method in which a lifecycle of processes is controlled by a process lifecycle manager in the single mode, and controlled by a redundancy manager in the redundant mode is used.

Thus, software developers should develop a control interface of each of the process lifecycle manager and the redundancy manager so as to control the lifecycle of the processes in the redundant mode. That is, an interface with the process lifecycle manager should be developed for the single mode and an interface with the redundancy manager should be separately developed for the redundant mode.

Therefore, a development scheme of developing a separate interface according to such an operation mode of the network operating system complicates software, causes an increase in a development cost, and increases a maintenance cost.

SUMMARY

Accordingly, example embodiments of the present invention are provided to substantially obviate one or more problems due to limitations and disadvantages of the related art.

Example embodiments of the present invention provide a method of controlling a process based on a network operation mode, capable of managing a process lifecycle through the same interface regardless of the network operation mode.

Example embodiments of the present invention also provide an apparatus for controlling a process based on a network operation mode, which performs the process controlling method.

In other example embodiments, a method of controlling a process based on a network operation mode is a process controlling method performed in a network device, includes: determining the operation mode for an operating system of the network device; determining an entity for controlling a process based on the determined operation mode; and controlling the process through the determined entity Here, the determining of the entity for controlling the process may include controlling an operation of the process through a redundancy manager and a lifecycle manager that is in conjunction with the redundancy manager when the operation mode is a redundant mode.

Here, the operation of the process may include an active role or a standby role.

Here, the controlling of the process may include determining an active redundancy manager and a standby redundancy manager through cooperation between a plurality of redundancy managers; and assigning an active role to the process through a lifecycle manager that is in conjunction with the determined active redundancy manager.

Here, the determining of the entity for controlling the process may include controlling an operation of the process through a lifecycle manager when the operation mode is a single mode.

Here, the controlling of the process may include monitoring failure of the process through the lifecycle manager; and assigning a role to the process through the lifecycle manager.

Here, the assigning of the role to the process may include determining whether a redundant mode of the network device is operated; and determining an entity for assigning the role of the process based on a result of the determination.

Here, the determining of the entity for assigning the role of the process may include assigning the role of the process through the lifecycle manager that is in conjunction with a redundancy manager when the redundant mode is operated; and assigning the assigned role to the process through the lifecycle manager.

Here, the determining of the entity for assigning the role of the process may include assigning an active role to the process through the lifecycle manager when the single mode is operated.

In still other example embodiments, an apparatus for controlling a process based on an operation mode includes: a processing unit configured to determine the operation mode for an operating system of a network device, determining an entity for controlling a process based on the determined operation mode, and controlling the process through the determined entity; and a storage unit configured to store information processed by the processing unit and information to be processed by the processing unit.

Here, the processing unit may control an operation of the process through a redundancy manager and a lifecycle manager that is in conjunction with the redundancy manager when the operation mode is a redundant mode.

Here, the operation of the process may include an active role or a standby role.

Here, the processing unit may determine an active redundancy manager and a standby redundancy manager through cooperation between a plurality of redundancy managers, and assign an active role to the process through a lifecycle manager that is in conjunction with the determined active redundancy manager.

Here, the processing unit may control an operation of the process through a lifecycle manager when the operation mode is a single mode.

Here, the processing unit may monitor failure of the process through the lifecycle manager, and assign a role to the process through the lifecycle manager.

Here, the processing unit may determine whether a redundant mode of the network device is operated, and determine an entity for assigning the role of the process based on a result of the determination.

Here, the processing unit may assign the role of the process through the lifecycle manager that is in conjunction with a redundancy manager when the redundant mode is operated, and assign the assigned role to the process through the lifecycle manager.

Here, the processing unit may assign an active role to the process through the lifecycle manager when the single mode is operated.

According to the method of controlling a process based on a network operation mode and the apparatus therefor as described, it is possible to control the process lifecycle through the same interface regardless of the network operation mode.

Further, by developing a separate interface according to the network operation mode, it is possible to decrease a software development cost and a maintenance cost.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
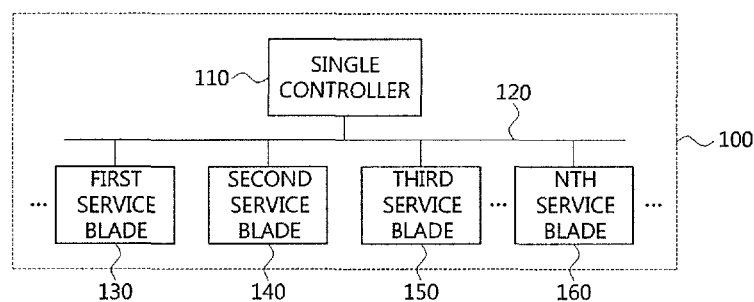
FIG. 1 is a conceptual diagram illustrating a network device operating in a single mode.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred example embodiments of the present invention will be described in greater detail with reference to the accompanying drawings. The same components in the drawings are denoted with the same reference numerals and repeated description will be omitted.

Hereinafter, a method of controlling a process based on a network operation mode described with reference to FIGS. 8 to 11 may be performed in an apparatus for controlling a process based on a network operation mode illustrated in FIG. 12.

FIG. 1 is a conceptual diagram illustrating a network device operating in a single mode.

Referring to FIG. 1, a network device 100 operating in a single mode may generally include a single controller 110. Further, the network device 100 may include a plurality of service blades. For example, the network device 100 may include a first service blade 130, a second service blade 140, a third service blade 150, . . . , an $n^{th}$ service blade 160.

For example, when the network device 100 is a router, the service blade may be a line card of the router that is in charge of a packet forwarding service.

A communication channel 120 for exchanging control information may be provided between the single controller 110 and the plurality of service blades.

Figure 2:
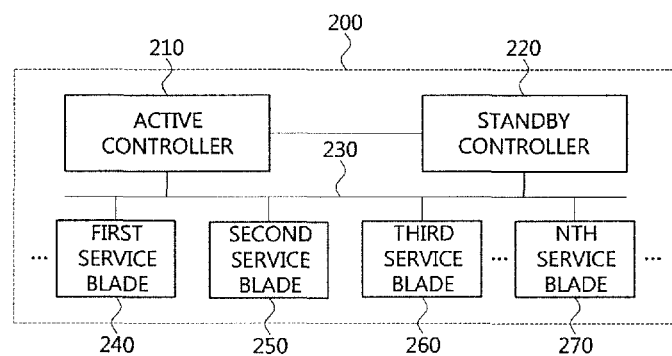
FIG. 2 is a conceptual diagram illustrating a network device operating in a redundant mode.

FIG. 2 is a conceptual diagram illustrating a network device operating in a redundant mode.

Referring to FIG. 2, the network device 200 operating in a redundant mode may generally include an active controller 210 and a standby controller 220.

The network device 200 may actually perform service via the active controller 210. When hardware or software of the active controller 210 fails during an operation, the network device 200 causes the standby controller 220 to take over a role of the active controller 210 to be able to provide continuous service. That is, the standby controller 220 may mean a kind of backup device.

Further, the network device 200 may include a plurality of service blades, similarly to the network device 100 operating in a single mode described with reference to FIG. 1. For example, the network device 200 may include a first service blade 240, a second service blade 250, a third service blade 260, . . . , an $n^{th}$ service blade 270.

Figure 3:
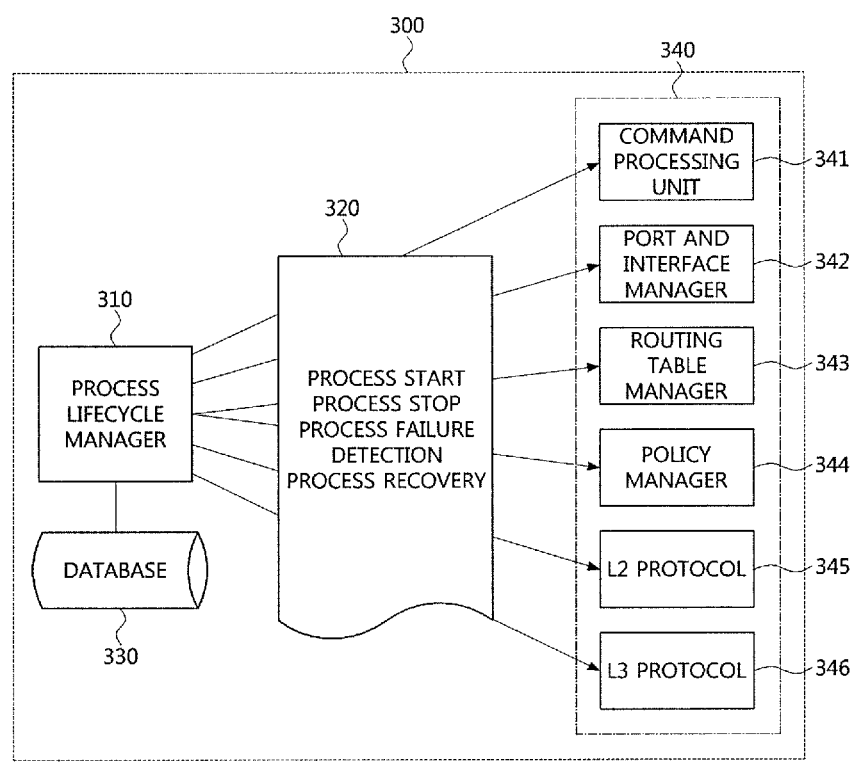
FIG. 3 is a conceptual diagram illustrating a method of managing a process lifecycle, which is performed in a general network device.

FIG. 3 is a conceptual diagram illustrating a method of managing a process lifecycle in a general network device.

Referring to FIG. 3, an operating system of the network device may include a process lifecycle manager 310, and a database 330, and a plurality of software 340 that realize various functions of the network device may be installed.

The process lifecycle manager 310 may search for a process to be executed among various processes included in the network device, and perform a function of controlling a lifecycle 320 of the process.

In the network device, the lifecycle 320 of the process may mean start of the process (StartProcess), stop of the process (StopProcess), failure detection of the process (MonitorProcess), and failure recovery of the process (RecoverProcess).

When the network device performs a function of recovering a process failure, the network device is able to perform various functions, such as process restart, system restart, and notification to a manager, according to a role and importance of the process.

Further, the plurality of software 340 may include, for example, a command processing unit 341, a port and interface manager 342, a routing table manager 343, a policy manager 344, an L2 protocol 345, and an L3 protocol 346.

The command processing unit 341 may perform a function of processing commands, the port and interface manager 342 may perform a function of managing a port and an interface connected to the network device, and the routing table manager 343 may perform a function of managing a routing table. Further, the policy manager 344 may perform a function of managing a policy, such as quality of service (QoS) or filtering.

The L2 protocol 345 may mean a layer 2 protocol, such as a spanning tree protocol (STP) for collecting information related to layer 2 on the network, and a link aggregation control protocol (LACP).

Further, the L3 protocol 346 may mean a layer 3 protocol, such as routing information protocol (RIP) for collecting routing information related to layer 3 on the network, a shortest path first protocol (OSPF: Open Shortest Path First), an inter-intermediate-system communication (IS-IS: Intermediate System to Intermediate System) and border path protocol (BGP: Border Gateway Protocol).

In general, the configuration of the network device and various software installed in the network device as described above may be referred to as a network operating system 300.

The software 340 installed in the network operating system 300 may include software in various forms depending on the viewpoint of a developer. For example, functions of the port and interface manager 342, the routing table manager 343, and the policy manager 344 are integrated to be developed as one software block.

Figure 4:
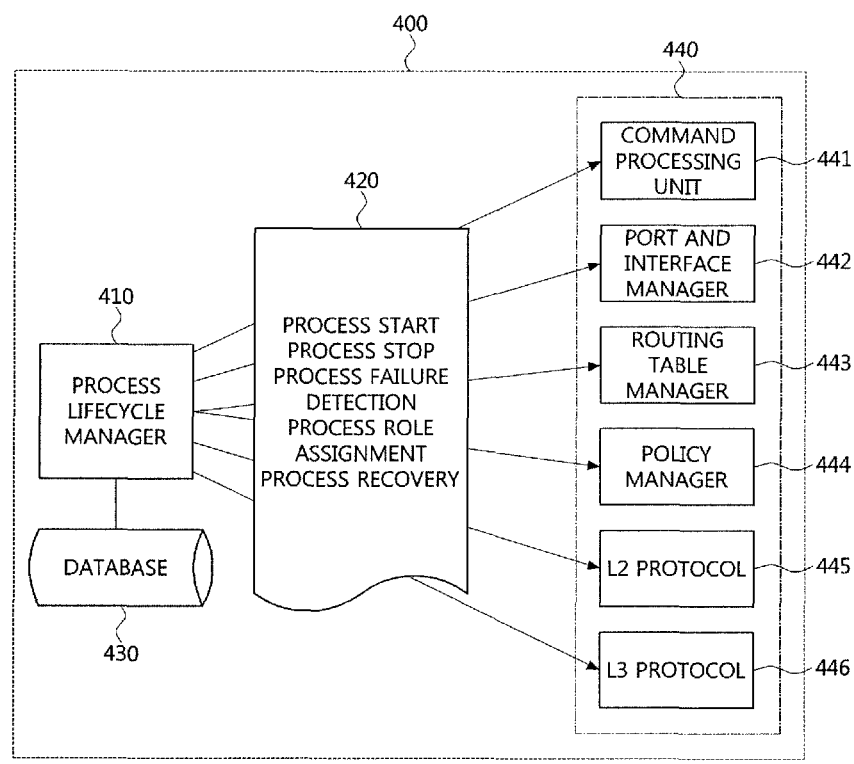
FIG. 4 is a conceptual diagram illustrating a method of managing a process lifecycle, in which a process role assignment function is added.

FIG. 4 is a conceptual diagram illustrating a method of managing a process lifecycle, in which a process role assignment function is added.

Referring to FIG. 4, a network operating system 400 may include a process lifecycle manager 410, and a database 430, and a plurality of software 440 that realizes various functions of a network device may be installed.

The process lifecycle manager 410 can control a process lifecycle 420 to which the process role assignment function is added.

The plurality of software 440 may include a command processing unit 441, a port and interface manager 442, a routing table manager 443, a policy manager 444, an L2 protocol 445, and an L3 protocol 446, as described with reference to FIG. 3.

The network device may assign an active role or a standby role to the process. A process playing an active role may actually play a role of providing a service to be provided, and a process playing a standby role does not provide a service and may maintain state information synchronized with the process playing an active role.

Thereafter, when the process playing an active role fails, the network device is able to continuously provide the service based on the synchronized state information of the process that is in a standby state due to its standby role. Thus, the network device may have to assign the active role or the standby role to the process.

Figure 5:
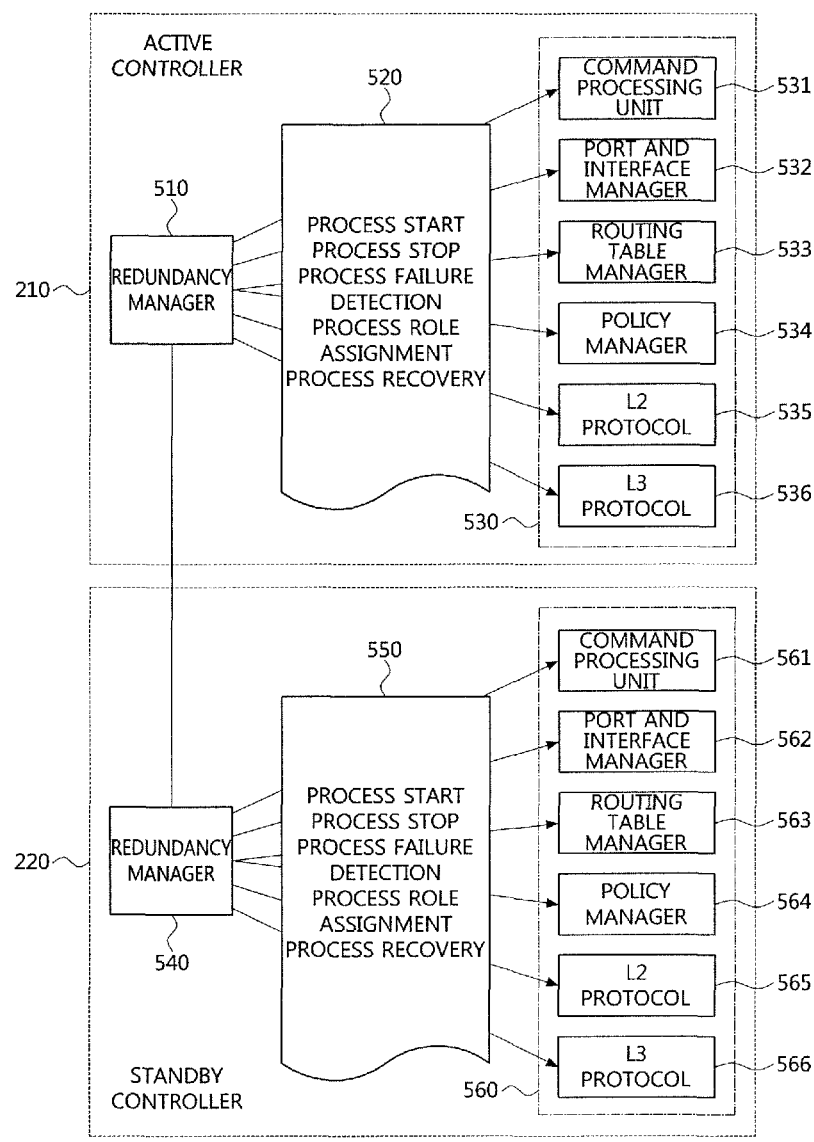
FIG. 5 is a conceptual diagram illustrating a method of managing a process lifecycle, which is performed in a network device operating in a redundant mode.

FIG. 5 is a conceptual diagram illustrating a method of managing a process lifecycle, which is performed in a network device operated in a redundant mode.

Referring to FIG. 5, an operating system of the network device operated in a redundant mode may include a plurality of redundancy managers for a redundant mode operation. The plurality of redundancy managers may determine an active or standby role through mutual cooperation. Further, a plurality of software 530 and 560 that realize various functions of the network device may be installed.

The network device may include an active controller 210 and a standby controller 220 for a redundant mode operation.

The redundancy managers 510 and 540 may control lifecycles 520 and 550 of the process, similarly to the process lifecycle manager of the network operating system operated in the single mode.

Further, the redundancy managers 510 and 540 may monitor a failure of the active controller 210 and the standby controller 220, and perform a failover function through switchover from the active role to the standby role when the controller fails.

The redundancy managers 510 and 540 may perform additional functions, such as a switchover function of performing switchover between the active role and the standby role so as to upgrade the software of the network operating system, in addition to the failover function.

The process lifecycle controlled through the redundancy managers 510 and 540 and the plurality of software installed in the network device may be the same as those described with reference to FIGS. 3 and 4.

Figure 6:
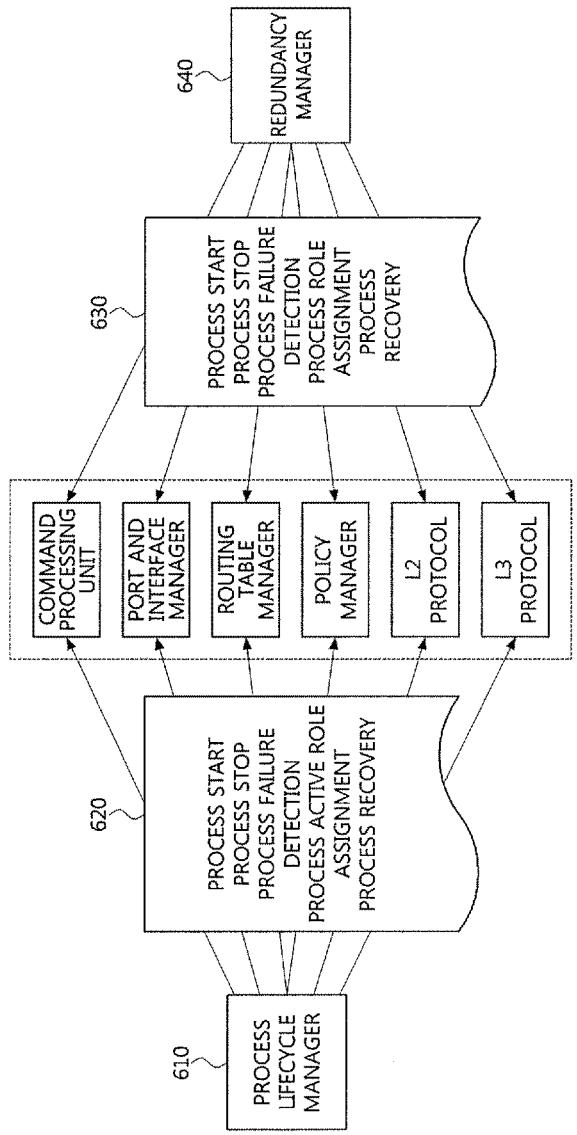
FIG. 6 is a conceptual diagram illustrating a method of managing a process lifecycle in both a mode single and a redundant mode.

FIG. 6 is a conceptual diagram illustrating a method of managing a process lifecycle in both a mode single and a redundant mode.

Referring to FIG. 6, in an operating system of a network device operated in the single mode, a process lifecycle 620 may be controlled through a process lifecycle manager 610, and in a network operating system operated in the redundant mode, a process lifecycle 630 may be controlled through a redundancy manager 640.

In the scheme of controlling a lifecycle of a process as described above, a process lifecycle control interface should be separately developed depending on the single mode and the redundant mode. That is, an interface for the process lifecycle 620 should be developed as an interface for the single mode, and an interface for the process lifecycle 630 should be developed as an interface for the redundant mode. Such a development scheme complicates software, causes an increase in a development cost, and increases a maintenance cost.

Therefore, the present invention provides a method capable of controlling the lifecycle of the process through the same interface.

Figure 7:
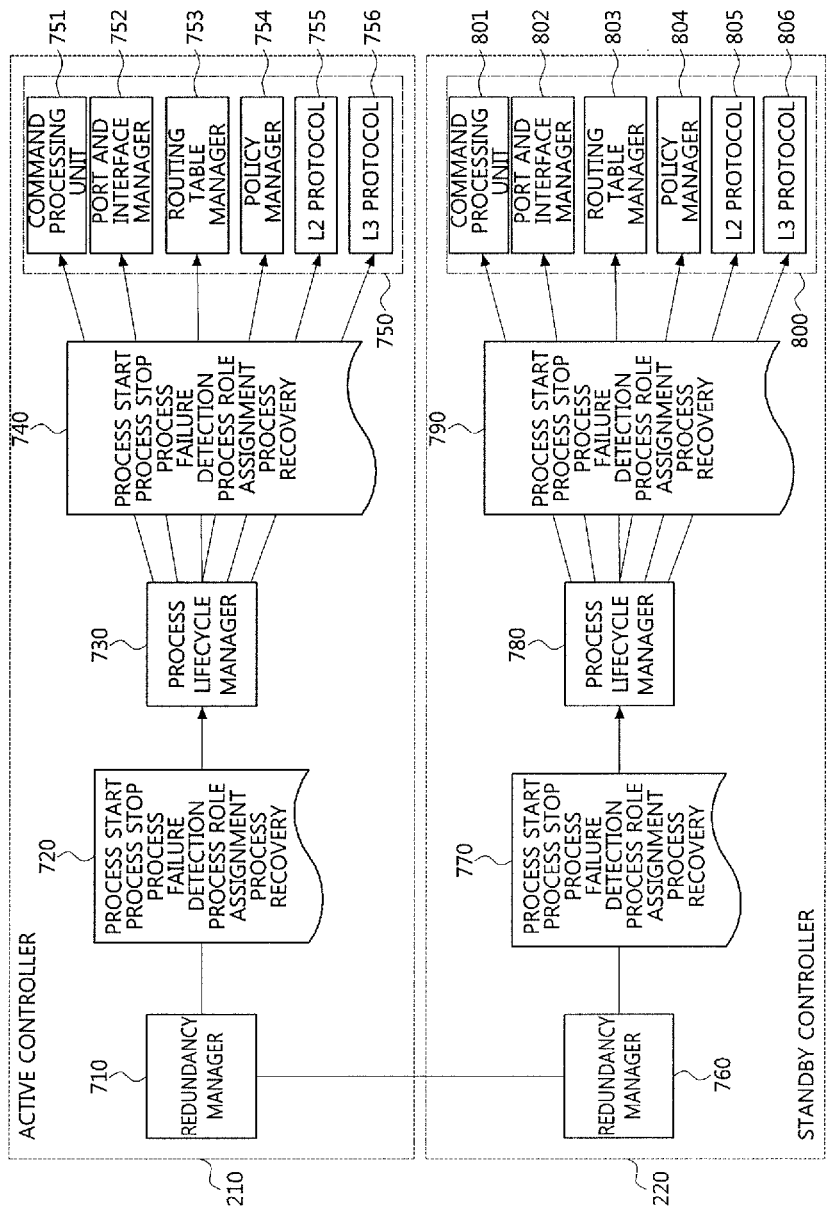
FIG. 7 is a conceptual diagram illustrating a method of controlling a process based on a network operation mode according to an example embodiment of the present invention.

FIG. 7 is a conceptual diagram illustrating a method of controlling a process based on an operation mode in a network device according to an example embodiment of the present invention.

Referring to FIG. 7, the network device may include redundancy managers 710 and 760, and process lifecycle managers 730 and 780. A plurality of software 750 and 800 that realize various functions of the network device may be installed in the network device.

The redundancy managers 710 and 760 may determine an active role or a standby role of each controller through mutual cooperation, and may monitor failure in each controller, as described with reference to FIG. 5.

The plurality of software 750 and 800 may have the same meanings as a plurality of processes 751, 752, 753, 754, 755, 756, 801, 802, 803, 804, 805 and 806 for providing service in a network operating system.

The network device according to the present invention may control the lifecycle of the process with the same interface for process lifecycles 720, 740, 770, and 790 regardless of the operation mode of the network operating system.

Specifically, when the network operating system is operated in a single mode, the network device may control the lifecycle of the processes 750 and 800 through the process lifecycle interfaces 740 and 790 of the process lifecycle managers 730 and 780.

Further, when the network operating system is operated in a redundant mode, the network device may control the lifecycle of the processes 750 and 800 through the same process lifecycle interfaces 720 and 770 of the redundancy managers 710 and 760 as the interfaces of the lifecycle managers 730 and 780.

The redundancy managers 710 and 760 may control the lifecycle of the processes 750 and 800 through the same process lifecycle interface. The redundancy managers 710 and 760 may transfer a control command to the process lifecycle managers 730 and 780. The process lifecycle managers 730 and 780 may relay the received control command to control the processes 750 and 800.

Therefore, the network device according to the present invention may control the lifecycle of the process through the same process lifecycle interface regardless of the operation mode of the network operating system.

Figure 8:
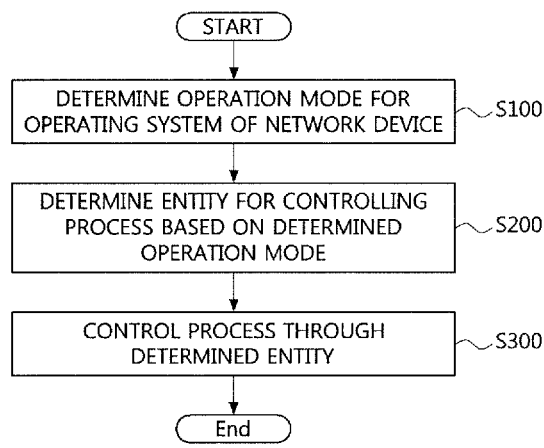
FIG. 8 is a flowchart illustrating the method of controlling a process based on a network operation mode according to an example embodiment of the present invention.

FIG. 8 is a flowchart illustrating a method of controlling a process based on a network operation mode according to an example embodiment of the present invention.

Referring to FIG. 8, the network device may determine the operation mode of the network operating system (S100).

The network device may set a different operation mode depending on importance of a function performed by the network device. Specifically, the operation mode of the network operating system may mean a single mode or a redundant mode.

When the function to be performed is important, the network device may operate the network operating system in the redundant mode so as to provide the service seamlessly and continuously.

The redundant mode may mean an active mode in which a service is actually provided and a standby mode in which standby is performed while maintaining synchronized state information.

Thereafter, the network device may determine an entity for controlling the lifecycle of the process based on the determined operation mode of the network operating system (S200).

Figure 9:
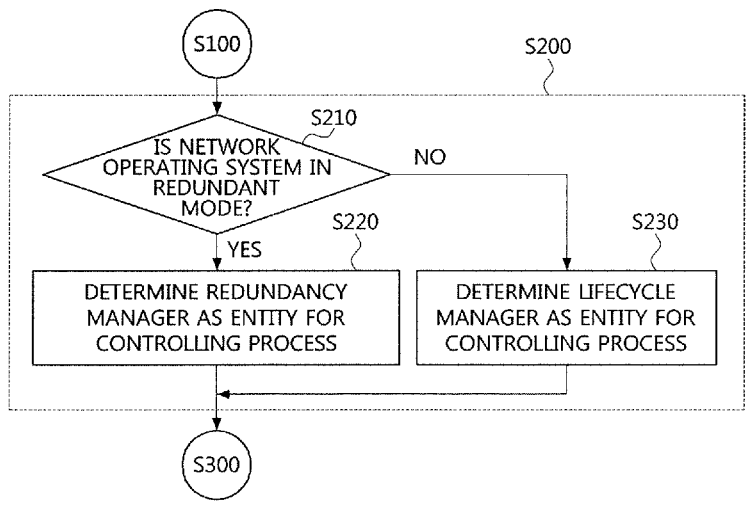
FIG. 9 is a flowchart illustrating a step of determining an entity for controlling a process based on the operation mode illustrated in FIG. 8.

FIG. 9 is a flowchart illustrating a step of determining an entity for controlling a process based on the operation mode in FIG. 8.

Referring to FIG. 9, the network device may determine whether the operation mode of the network operating system is a redundant mode (S210).

When the operation mode of the network operating system is a redundant mode, the network device may determine the redundancy manager as an entity for controlling the lifecycle of the process (S220).

The network device may control the lifecycle of the process through the redundancy manager and the process lifecycle manager that is in conjunction with the redundancy manager. For example, the network device may determine the lifecycle of the process to be controlled through the redundancy manager, and transfer the determined lifecycle of the process to the process lifecycle manager. Thereafter, the network device may directly control the lifecycle of the process through the process lifecycle manager.

On the other hand, when the operation mode of the network operating system is not a redundant mode, the network device may determine the process lifecycle manager as the entity for controlling the lifecycle of the process (S230).

The network device may determine the entity for controlling the process lifecycle using the method of step S220 or S230 described above.

Referring back to FIG. 8, the network device may control the lifecycle of the process through the redundancy manager or the process lifecycle manager determined in step S220 or S230 (S300).

Figure 10:
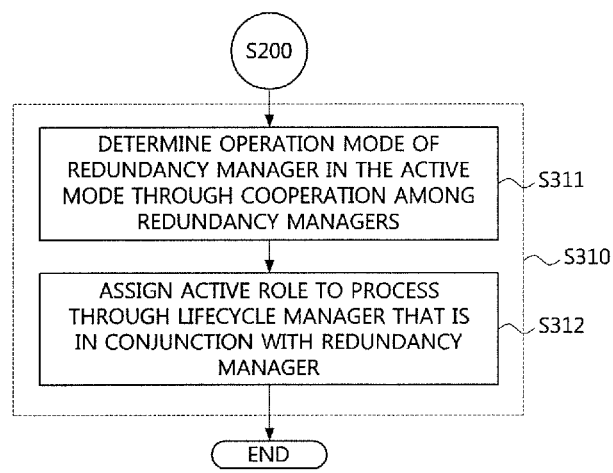
FIG. 10 is a flowchart illustrating a method of controlling a process lifecycle through a redundancy manager.

FIG. 10 is a flowchart illustrating a method of controlling a process lifecycle through the redundancy manager.

A method of controlling (S300) the lifecycle of the process when the redundancy manager is determined as an entity for controlling the lifecycle of the process in step S210 of FIG. 9 will be described with reference to FIG. 10.

Referring to FIG. 10, the network device may determine that the operation mode of the network operating system is a redundant mode, and determine the redundancy manager as an entity for controlling the lifecycle of the process (S200).

Thereafter, the network device may determine the redundancy manager in the active mode that is able to assign an active role to the process, through cooperation among a plurality of redundancy managers (S311).

While the redundancy manager in the active mode among the plurality of redundancy managers in the network device has been disclosed in the embodiment of the present invention, the present invention is not limited to the redundancy manager in the active mode, and the redundancy manager in a standby mode among the plurality of redundancy managers may be determined. That is, the operation mode of the redundancy manager may mean the active mode in which the active role of the process is assigned or the standby mode in which the standby role of the process is assigned.

Thereafter, the network device may assign the active role to the process through the process lifecycle manager that is in conjunction with the redundancy manager in the mode active (S312).

For example, the network device may transfer the active role to be assigned to the process through the redundancy manager to the process lifecycle manager that is in conjunction with the redundancy manager. Thereafter, the network device may directly assign the active role to the process through the process lifecycle manager.

Further, the network device may assign the standby role to the process through the process lifecycle manager that is in conjunction with the redundancy manager in the standby mode.

The network device may transfer the role of the process corresponding to the operation mode of the redundancy manager to the process lifecycle manager, and the process lifecycle manager may relay the received role of the process to assign the role to the process.

Figure 11:
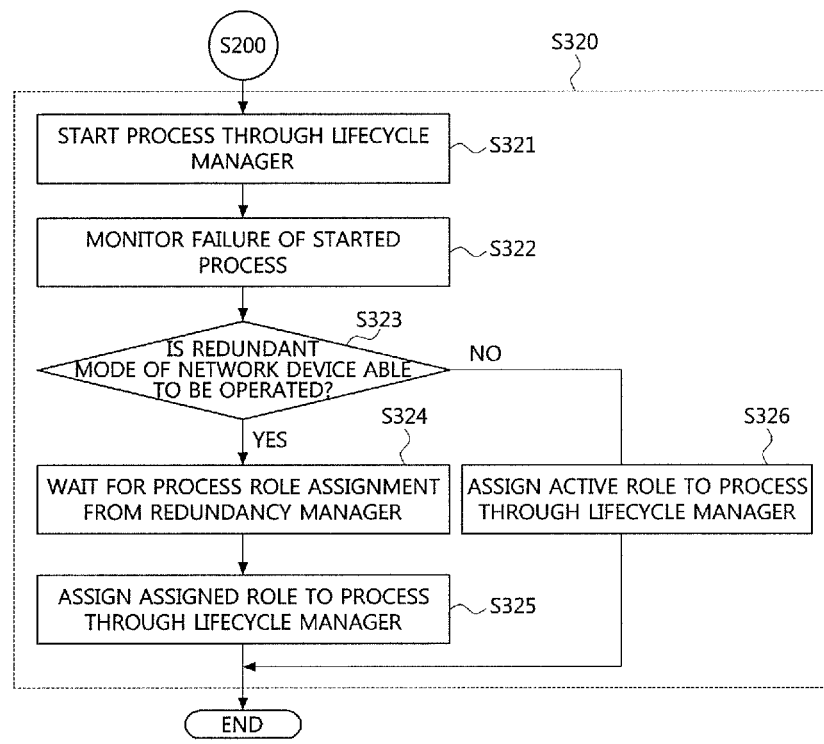
FIG. 11 is a flowchart illustrating a method of controlling a process lifecycle through a process lifecycle manager.

FIG. 11 is a flowchart illustrating a method of controlling a process lifecycle through the process lifecycle manager.

A method of controlling (S300) the lifecycle of the process when the process lifecycle manager is determined as an entity for controlling the lifecycle of the process in step S210 of FIG. 9 will be described with reference to FIG. 11.

The network device may determine that the operation mode of the network operating system is not the redundant mode, and determine the process lifecycle manager as an entity for controlling the lifecycle of the process (S200).

The network device may start a process to be executed through the process lifecycle manager (S321).

For example, the network device may search for a configuration database through the process lifecycle manager, and determine the process to be executed based on a search result.

Thereafter, the network device may monitor failure of the started process through the process lifecycle manager (S322).

Thereafter, the network device may determine whether the redundant mode of the network operating system is able to be operated (S323).

When it is determined that the redundant mode of the network operating system is able to be operated, the network device may assign the role of the process through the redundancy manager (S324).

Thereafter, the network device may transfer the role of the process assigned through the redundancy manager to the process lifecycle manager. The network device may assign the role of the process received from the redundancy manager to the process through the process lifecycle manager (S325).

On the other hand, when it is determined in step S323 that the redundant mode of the network operating system is unable to be operated, the network device may assign the active role to the process through the process lifecycle manager (S326).

Figure 12:
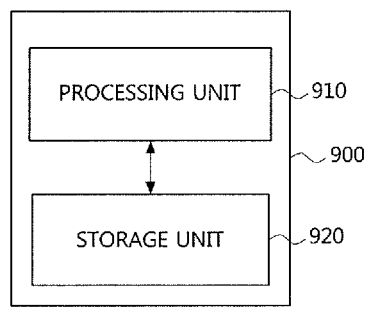
FIG. 12 is a block diagram illustrating an apparatus for controlling a process based on a network operation mode according to an example embodiment of the present invention.

FIG. 12 is a block diagram illustrating an apparatus for controlling a process based on a network operation mode according to the present invention.

Referring to FIG. 12, the process control device 900 according to the present invention may include a processing unit 910 and a storage unit 920.

The processing unit 910 may include a redundancy manager, and a process lifecycle manager.

The redundancy manager may perform a function of determining an active role or a standby role for a plurality of controllers of the network operating system operated in the redundant mode. Further, the redundancy manager may perform a function of monitoring failure of the controllers.

The process lifecycle manager may perform a function of controlling the lifecycle of the process.

The plurality of processes may be the same as the plurality of software installed in the network device described with reference to FIGS. 3 to 7.

Here, the processing unit 910 may include a processor and a memory. The processor may mean a general-purpose processor (for example, a CPU (Central Processing Unit) and/or a GPU (Graphic Processing Unit) or a dedicated processor for the method of controlling a process based on a network operation mode. A program code for a method of controlling a process based on a network operation mode may be stored in the memory. That is, the processor may read the program code stored in the memory, and perform each step of the method of controlling a process based on a network operation mode, based on the read program code.

The storage unit 920 may store information processed by the processing unit 910 and information to be processed by the processing unit 910. For example, the storage unit 920 may store the operation mode of the network operating system, and a command for controlling a process of the redundancy manager or the process lifecycle manager.

While the example embodiments of the present invention and their advantages have been described in detail, it should be understood that various changes, substitutions and alterations may be made herein without departing from the scope of the invention.

DESCRIPTION OF REFERENCE NUMERALS

100: network device in single mode
110: single controller
200: network device in redundancy mode
210: active controller
220: standby controller
300, 400: network operating system
900: process control device
910: processing unit
920: storage unit

What is claimed is:

1. In a process controlling method performed in a network device, a method of controlling a process based on an operation mode comprising:
    determining the operation mode for an operating system of the network device;
    determining an entity for controlling a process based on the determined operation mode; and
    controlling the process through the determined entity,
    wherein the determining of the entity for controlling the process includes controlling an operation of the process through a redundancy manager and a lifecycle manager that in conjunction with the redundancy manager when the operation mode is a redundant mode, and
    wherein the determining of the entity for controlling the process includes controlling an operation of the process through a lifecycle manager when the operation mode is a single mode.

2. The method according to claim 1,
    wherein the operation of the process includes an active role or a standby role.

3. The method according to claim 1,
wherein the controlling of the process includes
determining an active redundancy manager and a standby redundancy manager through cooperation between a plurality of redundancy managers; and
assigning an active role to the process through a lifecycle manager that is in conjunction with the determined active redundancy manager.

4. The method according to claim 1,
wherein the controlling of the process includes
monitoring failure of the process through the lifecycle manager; and
assigning a role to the process through the lifecycle manager.

5. The method according to claim 4,
wherein the assigning of the role to the process includes
determining whether a redundant mode of the network device is operated; and
determining an entity for assigning the role of the process based on a result of the determination.

6. The method according to claim 5,
wherein the determining of the entity for assigning the role of the process includes
assigning the role of the process through the lifecycle manager that is in conjunction with a redundancy manager when the redundant mode is operated; and
assigning the assigned role to the process through the lifecycle manager.

7. The method according to claim 5,
wherein the determining of the entity for assigning the role of the process includes assigning an active role to the process through the lifecycle manager when the single mode is operated.

8. An apparatus for controlling a process based on an operation mode, the apparatus comprising:
a processing unit configured to determine the operation mode for an operating system of a network device, determining an entity for controlling a process based on the determined operation mode, and controlling the process through the determined entity; and
a storage unit configured to store information processed by the processing unit and information to be processed by the processing unit,
wherein the processing unit controls an operation of the process through a redundancy manager and a lifecycle manager that is in conjunction with the redundancy manager when the operation mode is a redundant mode, and
wherein the processing unit controls an operation of the process through a lifecycle manager when the operation mode is a single mode.

9. The apparatus according to claim 8,
wherein the operation of the process includes an active role or a standby role.

10. The apparatus according to claim 8,
wherein the processing unit determines an active redundancy manager and a standby redundancy manager through cooperation between a plurality of redundancy managers, and assigns an active role to the process through a lifecycle manager that is in conjunction with the determined active redundancy manager.

11. The apparatus according to claim 8,
wherein the processing unit monitors failure of the process through the lifecycle manager, and assigns a role to the process through the lifecycle manager.

12. The apparatus according to claim 11,
wherein the processing unit determines whether a redundant mode of the network device is operated, and determines an entity for assigning the role of the process based on a result of the determination.

13. The apparatus according to claim 12,
wherein the processing unit assigns the role of the process through the lifecycle manager that is in conjunction with a redundancy manager when the redundant mode is operated, and assigns the assigned role to the process through the lifecycle manager.

14. The apparatus according to claim 12,
wherein the processing unit assigns an active roe to the process through the lifecycle manager when the single mode is operated.

15. In a process controlling method performed in a network device, a method of controlling a process comprising:
determining a single mode or a redundant mode for an operating system of the network device;
determining a redundancy manager or a lifecycle manager for controlling a process based on the determined mode;
when the redundancy manager is determined, determining an active redundancy manager and a standby redundancy manager through cooperation between a plurality of redundancy managers; and
assigning an active role to the process through the lifecycle manager, wherein when the redundancy manager is determined the lifecycle manager is In conjunction with the determined active redundancy manager.

* * * * *